Jan. 23, 1968  D. E. BRZEZINSKI ETAL  3,365,599
MAGNETIC CIRCUIT

Filed March 17, 1965  2 Sheets-Sheet 1

INVENTORS
DONALD E. BRZEZINSKI
RAYMOND L. WATTS
BY *Joseph A. Semignani*
ATTORNEY

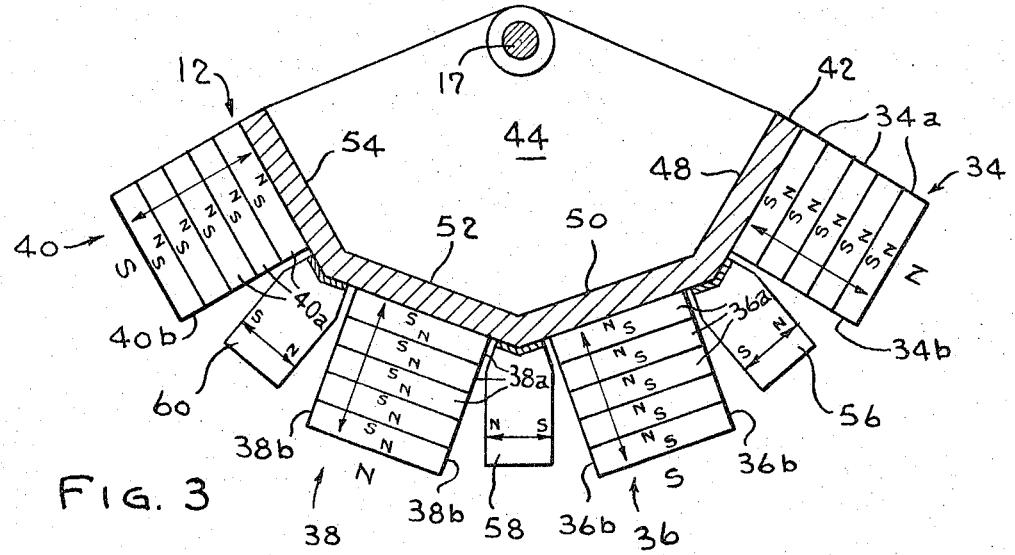

United States Patent Office 3,365,599
Patented Jan. 23, 1968

3,365,599
MAGNETIC CIRCUIT
Donald E. Brzezinski, Brookfield, and Raymond L. Watts, Mukwonago, Wis., assignors to Wehr Corporation, Milwaukee, Wis., a corporation of Wisconsin
Filed Mar. 17, 1965, Ser. No. 441,001
14 Claims. (Cl. 210—222)

ABSTRACT OF THE DISCLOSURE

This disclosure relates to a magnetic circuit for use in apparatus such as magnetic separators. A number of permanent magnet field generating members are arranged in relative spaced relationship on a backing plate of magnetic material which completes a closed magnetic circuit between the generating members. The generating members have an extension away from the backing plate and additional permanent magnetic members are arranged between adjacent field generating members. The field generating members are magnetized in the direction of their extension from the backing plate, whereas the blocking members are magnetized in the direction of a transversal to that extension and are arranged to present a magnetic polarity along the extension of a given one of the magnetic field generating members which corresponds to the magnetic polarity presented at the outer polar end of that field generating member. Preferably, the field generating magnetic members are made of a material having a relatively high energy product with respect to the flux blocking magnetic members and the flux blocking members have a relatively high coerciveness with respect to the field generating members.

---

This invention relates to magnetic circuits and, more particularly, to an improved magnetic circuit particularly adapted for use in magnetic separators or similar type of apparatus.

A general object of this invention is to provide an improved magnetic circuit.

Another general object of this invention is to generate the magnetic field of a magnetic separator in a more effective and efficient manner.

Another object of this invention is to achieve a magnetic field of optimum strength from a given magnetic member.

Still another object is to achieve an optimum magnetomotive force reacting in the magnetic circuit for flux generating purposes.

A further object of this invention is to provide a magnetic circuit wherein both ceramic magnetic materials and high energy type magnetic materials, such as the alnico materials, can be used equally well in the magnetic circuit.

A still further general object of this invention is to simplify the construction of a magnetic separator and the magnetic circuit therefor.

For the achievement of these and other objects and taking for example and purposes of discussion two magnetic field generating members relatively arranged to present adjacent, different magnetic polarities in a common direction, this invention contemplates an arrangement which will concentrate emanation of flux through desired points in the field generating members. To achieve this end undesirable flux leakage between the field generating members is prevented by generating a magnetic field between the field generating members which opposes and prevents such flux leakage. To further contribute to increasing the strength of the generated field, a closed return flux path is completed between the field generating members, preferably by soft magnetic material extending between the generating members. This arrangement provides an optimum magnetic circuit wherein the flow of magnetic flux is concentrated within the field generating members, and the soft magnetic material, thereby providing a relatively greater magnetomotive force driving the flux through the field generating members to provide a field of optimum strength for the particular circuit.

Preferably the field generating members and the means providing the leakage preventing field, take the form of permanent magnetic members. The field generating members are made from relatively high permeable magnetic material, i.e. with respect to the magnetic member (or members) generating the leakage preventing field. The leakage preventing field generating member is made from high coercive material so that it can be exposed to the high strength field of the generating members and will resist the de-magnetizing force thereof and retain the preset magnetic orientation with respect to the generating members which is necessary to prevent the flux leakage.

Other objects and advantages will be pointed out in, or be apparent from, the specification and claims, as will obvious modifications of the embodiments shown in the drawings, in which:

FIG. 3 is a transverse sectional view of the magnetic circuit assembly incorporated in the separator illustrated in FIG. 1;

FIG. 4 is a sectional view of an alternate magnetic circuit arrangement; and

FIG. 5 is a sectional view of yet another alternative magnetic circuit arrangement.

The magnetic circuit of this invention has general application to magnetic field generating apparatus, however, it is particularly well suited to and affords particular advantages in a magnetic separator. Therefore, the magnetic circuit has been illustrated as incorporated in a magnetic drum type separator, but it will be appreciated that the invention is not limited to any particular separator construction nor is it in fact limited to the separator field.

Figure 1:
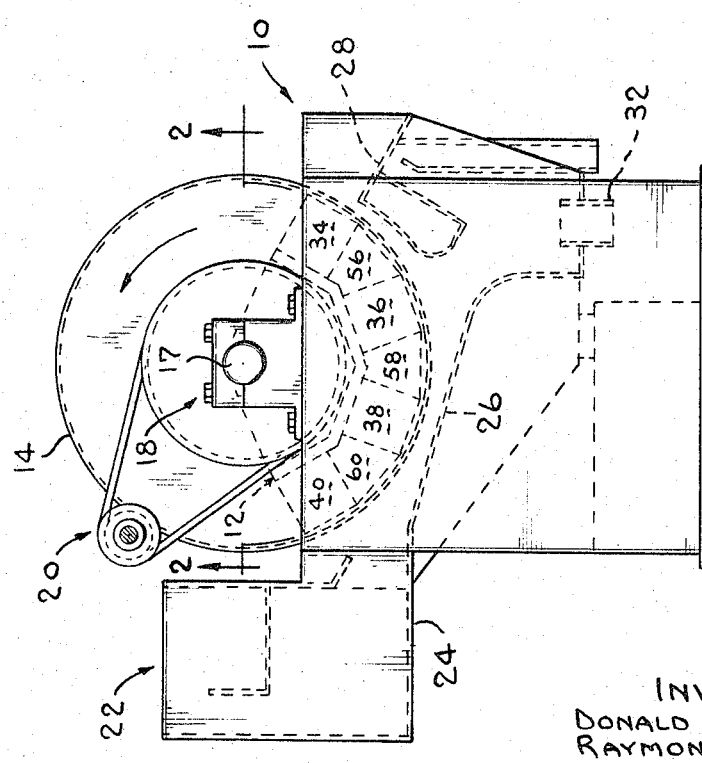
FIG. 1 is an end view of a drum type magnetic separator incorporating a magnetic circuit constructed in accordance with this invention.

With particular reference to FIG. 1, the drum type separator can have a construction such as that specifically disclosed and claimed in the co-pending application of Mr. Raymond L. Watts and Mr. Donald E. Brzezinski, entitled, "Magnetic Drum Separator and Tank Therefor," Ser. No. 440,512, filed Mar. 17, 1965, and assigned to the assignee of this application. It will be appreciated that the specific structural details of the magnetic separator do not form a part of this invention and, therefore, a detailed description of the separator will not be made with reliance being placed on the above identified co-pending application for a complete disclosure should one become necessary. Briefly, magnetic circuit 12 is fixedly supported within drum 14 and the drum is supported for rotation with respect to the tank and the magnetic circuit assembly by shaft 17 which is in turn supported on the tank by bearing assemblies 18 engaging the shafts ends (only one of the bearings being illustrated in the drawings). A suitable power source rotates drum 14 through drive assembly 20. The media to be processed is introduced into the tank through feed box 22 and flows along lower wall 24 of the feed box into the tank where it is transferred to angular tank wall 26. As the media flows along tank wall 26 it is exposed to the field of magnetic circuit 12 and magnetic portions entrained in the media are attracted to the outer surface of drum 14. The drum rotates through the media and carries the magnetic portions over separating plate 28 after which the magnetic portions leave the field of the magnetic circuit and separate from the drum. The magnetic portions fall back toward the tank but are caught by plate 28 and directed from the tank to a suitable receptacle (not shown). The media from which the magnetic portions have been separated drains from the tank through outlet 32 to a suitable receptacle (not shown) for other process uses or for passage through the separator a second time to remove magnetic portions which may remain in the media. Obviously, passage of the media through the separator can be repeated as often as desired or as may be required to achieve a particular degree of separation.

With this brief description of the separator in mind, magnetic circuit 12 will now be specifically described with reference being made to FIGS. 2 and 3. Structurally the magnetic circuit includes magnetic field generating assemblies 34, 36, 38 and 40 made up of a plurality of stacked individual magnetic segments 34a, 36a, 38a and 40a preferably made of well-known ceramic magnetic material. The magnetic field generating assemblies are suitably connected to backing plate 42 which in turn is connected to end plates 44 and 46 (see FIG. 2). Backing plate 42 is formed with a number of flat surfaces 48, 50, 52 and 54 and is generally arcuately arranged about the axis of drum rotation provided by shaft 17. Each of the magnetic segments 34a–40a are rectangular having a length, width and thickness dimension. In each field generating assembly the magnetic segments are stacked along their thickness dimension and in a generally radial direction from respective ones of surfaces 48–54 and relative to shaft 17. To complete the physical orientation of the segments relative to the axis of drum rotation, they are each arranged with their lengths extending axially and their widths extending generally parallel to a tangential plane. It will be appreciated that the magnetic circuit elements are not limited to any specific physical orientation with respect to the axis of drum rotation and can assume other arrangements without departing from the spirit or scope of this invention.

Magnetically, each of the segments 34a–40a is magnetized along its thickness dimension and the segments have a common magnetic orientation within a given magnetic field generating assembly so that the radially outer face of each magnetic assembly 34–40, i.e. the faces adjacent drum 14, presents a given magnetic polarity to the drum. More specifically and with reference to magnetic assembly 34, the segments 34a are each magnetized so that their radially inner faces are of the same magnetic polarity, for example a south magnetic pole, and their radially outer faces are of an opposite magnetic polartiy, a north magnetic pole. This arrangement attributes a definite magnetic axis to the field generating assembly which extends radially with respect to the drum and, in the instance of magnetic assembly 34, causes the magnetic assembly to in effect present a north magnetic pole at its outer polar end to the drum and a south magnetic pole at its inner polar end to backing plate 42 which will be discussed hereinafter.

For most effective separation it is preferred that the media undergoing the separation process be exposed to different magnetic polarities as it flows past the drum or as the magnetic portions thereof are carried past the magnetic circuit 12 by the drum. To achieve this end, adjacent magnetic assemblies 34, 36, 38 and 40 are of alternate magnetic polarity, that is if magnetic assembly 34 presents a north magnetic pole to the drum then magnetic assemblies 36, 38 and 40 are magnetized and arranged to present south, north and south magnetic poles to the drum, respectively. This has been illustrated in FIG. 3 by labeling the particular polarity of each magnetic segment and magnetic assembly. This alternate magnetic polarity is achieved effectively and simply through suitable arrangement of the field generating assembies and with the use of backing plate 42. The backing plate is preferably made of a soft magnetic material and completes a closed magnetic flux return circuit between adjacent ones of the magnetic field generating assemblies. A soft magnetic material is desirable because of its relatively high permeability and, furthermore, it is preferably selected so as to exhibit a relatively low coercivity. The back plate does not have a magnetic orientation of its own but will assume the magnetic characteristics induced therein by the magnetic assemblies 34, 36, 38 and 40. As such the permability of the juncture between the magnetic assemblies and the back plate is relatively high and the transference of magnetic flux therebetween occurs under optimum conditions and in the most effective manner, namely at right angles to the surface of the respective members. The back plate contributes measurably to achieving an optimum field from a given amount of magnetic circuit material.

Magnetic assemblies 34–40, connected by the backing plate, can be considered as a plurality of horse-shoe type magnets with, for example, magnetic assembly 34 forming one leg of a horse-shoe magnet and having a north magnetic polarity while magnetic assembly 36 forms the other leg having a south magnetic polarity and, similarly, magnetic assembly 36 forms one leg of a second horse-shoe magnet with assembly 38 forming the other leg and so on through the other magnetic assemblies.

The above described magnetic structure provides an effective and relatively simplified arrangement for generating a magnetic field, however a problem encountered with this arrangement is flux leakage along the magnetic axes and between opposed radially extending sides of the field generating assemblies, for example between side 34b of magnetic assembly 34 and side 36b of magnetic assembly 36. Obviously any leakage between the magnetic assemblies reduces the magnetomotive force driving the flux through the assemblies and the amount of flux emanating from the radially outer ends of the assemblies which correspondingly reduces the strength of the magnetic field generated. As a solution to this problem this invention proposes to prevent this undesirable flux leakage between adjacent magnetic assemblies. Preferably flux leakage is prevented by presenting, along the portions of the field generating assemblies through which undesirable leakage may occur, a magnetic polarity which corresponds to the polarity presented by the field generating assemblies to the drum. In the construction of FIGS. 1–3 the leakage preventing polarity is provided by magnetic flux blocking members 56, 58 and 60 arranged between adjacent ones of the field generating assemblies or, in other words, disposed in the windows defined by the legs of the horse-shoe magnets. Whereas the field generating assemblies have a radial magnetic axis, blocking members 56, 58 and 60 are magnetized along an axis extending parallel to a tangential plane with respect to drum 14 so as to be magnetized generally normal to the direction of magnetization of the field generating assemblies. In other words, the magnetic axis of the blocking member extends in the direction of a transversal to the magnetic axes of the field generating assemblies. Blocking member 56 is arranged to present a north magnetic polarity to field generating assembly 34 and a south magnetic polarity to field generating assembly 36, blocking member 58 is arranged to present a south magnetic polarity to field generating assembly 36 and a north magnetic polarity to field generating assembly 38, and so on as illustrated in FIG. 3 to block flux leakage between the field generating assemblies. With this arrangement no flux passes through the blocking members and all flux is concentrated within the field generating assemblies and the back plate.

Structurally, blocking members 56, 58 and 60 are made of ceramic magnetic material and can be suitably supported between end plates 44 and 46 or the back plate. The radial extension of the blocking members conforms generally to that of the magnetic assemblies but need not be exactly coextensive therewith. As illustrated, the radially inner ends of the blocking members can be spaced from the backing plate without adversely affecting the blockage of flux leakage because the flux in this area will tend to seek a path through the back plate rather than through air due to the relatively higher permeability of the back plate.

Although the individual magnetic segments of each field generating assembly are individual magnets having a north and south magnetic pole, each field generating assembly can be treated as being of one magnetic polarity with the blocking members preventing flux leakage, through the radial sides of the field generating assemblies thereby forcing all of the generated flux to emanate through the outer polar ends of the field generating assemblies and to flow through the return path provided by the field generating members and completed by the back plate. This concentration of the flux within the closed circuit increases the magnetomotive force driving the flux through the generating assemblies and increases the flux emanating from the generating assemblies to provide a magnetic field of optimum strength at the separator drum and through which the media being processed must flow. Preferably the magnetic assemblies 34, 36, 38 and which has a generally maximum energy product, energy product being the conventional manner of defining the ability to accommodate the flux concentration discussed above. Furthermore, 40 are made from a magnetic material which exhibits a relatively high permeability with respect to the blocking members and the blocking members are made of a highly coercive magnetic material so as to be capable of resisting the magnetizing forces of the magnetic assemblies which have a tendency to induce magnetization in the blocking members which would be opposite to the magnetic orientation of the blocking members with respect to the generating assemblies desired to block flux leakage.

One of the particularly advantageous features of the magnetic circuit of this invention is that it can use high energy material, such as the alnico materials as well as the ceramic magnetic materials; high energy magnetic material conventionally recognized as having a high or maximum energy product. The alnico materials are recognized as possessing desirable characteristics for use in magnetic circuits such as those of a magnetic separator, however, the leakage problem discussed above is of particular significance with regard to the use of the alnico material. Generally to acquire a magnetic field of adequate strength, for example in a circuit such as that just described, a considerable radial extension of alnico material is required and, of course, the greater the extension the more susceptible the field generating members are to leakage. This invention, by solving the problem of leakage, makes it possible to utilize field generating members made of alnico material advantageously in the magnetic circuit. In fact, it permits the extension of the field generating members to be increased, if desired, to achieve further generating strength and without any adverse effects from a leakage standpoint, i.e., the advantages gained by increasing the extension of the alnico members will not be cancelled out by the leakage which would otherwise result from the increased extension.

With reference to FIG. 4, alnico members 62, 64, 66, 68 and 70 are connected to and extend from backing plate 72. The alnico members are elongated and are disposed axially with a radial extension toward the inner drum face. Members 62–70 are magnetized in a manner to have a radial magnetic axis and thereby present a given magnetic polarity to the drum at their radially outer ends. More specifically, plate 72 is of soft magnetic material and completes a magnetic circuit between adjacent alnico members and adjacent alnico members present different magnetic polarities to the drum. For example, leg 62 presents a north and leg 64 a south magnetic pole with legs 66, 68 and 70 presenting north, south and north magnetic poles, respectively, members 62, 64, 66, 68 and 70 and backing plate 72 again exhibiting a relatively high permeability.

An alternate form which the magnetic flux blocking members 74, 76, 78 and 80 can assume is also illustrated in connection with the embodiment of FIG. 4 and in this instance leakage of magnetic flux is blocked by a plurality of stacked individual magnetic members 74a, 76a, 78a and 80a. These magnetic blocking members have a length extending generally coextensively with the axial extension of the alnico members, a radially disposed width and they are stacked along their thickness dimension. The segments are magnetized through their thickness dimension so that each stack of magnetic members has a magnetic axis which extends generally transversely of the magnetic axis of the alnico members. With members 62 and 64 presenting north and south magnetic poles, respectively, to the drum, segments 74a are all similarly magnetized so that the faces thereof directed toward member 62 present a north magnetic pole and the faces directed toward member 64 present a south magnetic pole. Here again it will be noted that the blocking members as an assembly have an extension parallel to and generally coextensive with the magnetic axis of the alnico members and present a magnetic polarity along the radial extension of each alnico member to counteract the tendency for flux leakage between adjacent ones of the alnico members. Also, as in the embodiments of FIGS. 1–3 the segments making up the blocking members are made of a relatively high coercive magnetic material.

Figure 2:
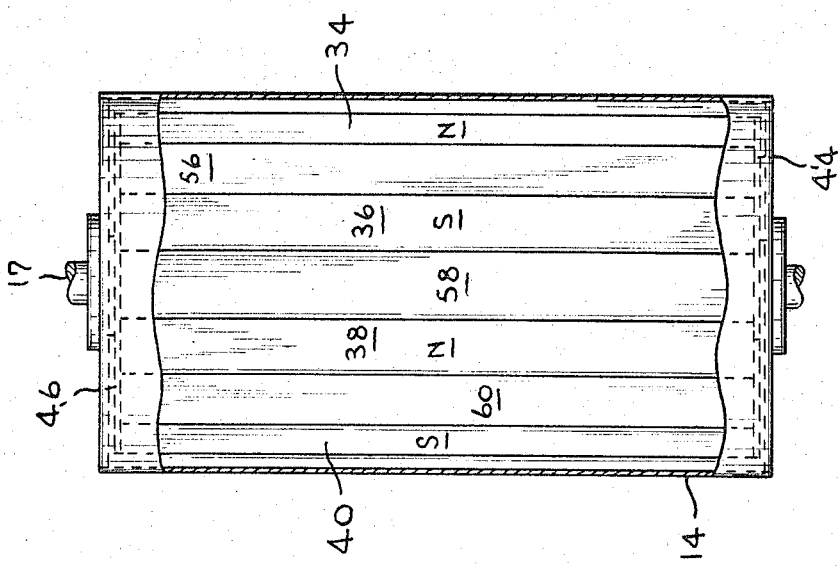
FIG. 2 is a plan view of the rotatable drum assembly of the separator of FIG. 1 with portions of the drum broken away to expose the magnetic circuit.

Although the embodiments of FIGS. 1–3 generate sufficient magnetic flux and adequately concentrate that magnetic flux without the use of additional pole pieces, pole pieces can in some applications contribute to a more effective field concentration. The use of magnetic poles is illustrated in FIG. 4, where alnico members 62–70 are provided with pole pieces 82–90 which are made of suitable magnetic material and are disposed between the outer radial ends of the alnico members and the inner face of the drum. The pole pieces, in a manner well known in the art, concentrate the magnetic flux emanating from the alnico generating members.

To further illustrate the versatility of the magetic circuit of this invention, another alternative construction is illustrated in FIG. 5. In this construction both the field generating assemblies 92, 94, 96, 98 and 100 and the flux blocking members 102, 104, 106 and 108 are made up of individual magnetic segments which in the field generating assemblies 92–100 are stacked in a radial direction and, in the flux blocking assemblies 102, 104, 106 and 108, are stacked transversely of and extend between adjacent ones of the field generating assemblies. Here again the magnetic segments have a common magnetic orientation within a given stack, field generating or flux blocking, and the field generating assemblies are supported on plate 120 to complete a magnetic circuit therebetween. The field generating assemblies are arranged to present alternate magnetic polarities to the magnetic drum and the blocking members have an extension along the radial extension of the field generating members and present a magnetic polarity to each of the field generating members which corresponds to the magnetic polarity presented by that field generating member to the drum so as to prevent leakage between adjacent ones of the assemblies. In the embodiment of FIG. 5 pole pieces 110, 112, 114, 116 and 118 are provided at the outer radial ends of each of the magnetic field generating stacks to assist in concentrating the magnetic flux, and again the field generating segments are made of relatively high permeable material, the back plate of soft magnetic material, and the blocking segments of high coercive material.

From the foregoing it will be appreciated that, in magnetic circuits constructed in accordance with this invention, undesirable flux leakage is eliminated, the emanation of magnetic flux is concentrated at the desired field generating points and an optimum magnetomotive force is generated from the standpoint of the field to be generated. Accordingly, the magnetic circuit material is utilized most effectively and optimum field strength is achieved for a given amount of magnetic material.

Although this invention has been illustrated and described in connection with particular embodiments thereof, it will be apparent to those skilled in the art that various changes and modifications may be made therein without departing from the spirit of the invention or from the scope of the appended claims.

We claim:

1. A magnetic separator assembly comprising, in combination,
   a drum,
   means supporting said drum for rotation,
   a plurality of first magnetic members,
   means supporting said first magnetic members in fixed relation within said drum and arranged in angularly spaced stacks extending radially with respect to and terminating adjacent said drum,
   each of said first magnetic members magnetized in a radial direction and having a common magnetic orientation within a given one of said stacks, adjacent ones of said stacks having different magnetic orientations and alternate ones of said stacks having a common magnetic orientation so that alternate ones of said stacks present different magnetic polarities to said drum and said stacks generate a magnetic field at said drum,
   magnetic means disposed between said stacks and having a radial extension between the inner and outer radial ends of said stacks, each of said magnetic means being magnetized along a magnetic axis extending in a direction generally parallel to a plane tangent to said drum and in the direction of a transversal to the radial extension of said stacks and arranged to present a magnetic polarity to a given stack which corresponds to the magnetic polarity presented by said given stack to said drum so that said magnetic means block the leakage of flux between adjacent ones of said stacks and concentrate generated flux in said stacks and the emanation of flux from said stacks through the radially outer ends thereof adjacent said drum to generate a relatively high strength magnetic field,
   and means of soft magnetic material extending between and connecting the radially inner ends of adjacent ones of said stacks to complete a closed magnetic circuit therebetween.

2. The separator assembly of claim 1 wherein said first magnetic members each have a length, width and thickness dimension and are arranged with their thickness dimension extending radially with respect to said drum and are magnetized through their thickness dimension,
   and wherein said magnetic means are in the form of second magnetic members having a length, width and thickness dimension, said second magnetic members extending generally parallel to said first magnetic members and stacked along their thickness dimension, said second magnetic members arranged into their thickness dimensions extending in the direction of a transversal to the radial extension of said first magnetic members and being magnetized through their thickness dimension.

3. The separator of claim 1 wherein said first magnetic members are of high energy product material with respect to said magnetic means and high magnetic means exhibit relatively high magnetic coerciveness with respect to said first magnetic members.

4. A magnetic separator assembly comprising, in combination,
   a drum,
   means supporting said drum for rotation,
   a plurality of first magnetic means,
   means supporting said first magnetic means within said drum and arranged to extend in a radial direction with respect to and terminating adjacent said drum,
   each of said first magnetic means magnetized in a radial direction with adjacent ones of said first magnetic means having different magnetic orientations and alternate ones of said first magnetic means having a common magnetic orientation so that adjacent ones of said first magnetic means present different magnetic polarities to said drum to generate a magnetic field at said drum,
   means spaced radially inwardly of said drum connected to and extending between adjacent ones of said first magnetic means to provide a path for magnetic flux therebetween,
   and second magnetic means disposed between said first magnetic means and having an extension in a radial direction along the radial extension of said first magnetic means, each of said second magnetic means being magnetized along a magnetic axis extending in the direction of a transversal to the radial extensions of said first magnetic means and arranged to present a magnetic polarity to a given one of said first magnetic means which corresponds to the magnetic polarity presented by said first magnetic means to said drum so that said second magnetic means blocks the leakage of flux between adjacent ones of said first magnetic means and concentrates the generated flux in said first magnetic means and the emanation of generated flux from said first magnetic means through the ends thereof adjacent of said drum.

5. A magnetic separator assembly comprising, in combination,
   a working surface,
   means supporting said working surface for movement,
   a plate of magnetic material,
   means connecting said plate in said separator in spaced relation from said working surface,
   first magnetic means engaging said plate and arranged thereon in relative spaced relation, said first magnetic means extending from said plate toward and terminating adjacent said working surface, each of said first magnetic means magnetized in the direction of their extension toward said working surface and said plate completing a closed magnetic circuit path between adjacent ones of said first magnetic means with the outer ends of said first magnetic means adjacent said working surface presenting a given magnetic polarity to said working surface,
   and second magnetic means having a relatively high magnetic coerciveness with respect to said first magnetic means and disposed operatively adjacent each of said first magnetic means and having an extension along the extension of respective ones of said first magnetic means and between the inner and outer ends thereof, said second magnetic means being magnetized to present a magnetic polarity along the extension of said first magnetic means which corresponds to the magnetic polarity presented by said first magnetic means to said working surface so that said second magnetic means blocks the leakage of flux from said first magnetic means along the extension thereof and concentrates generated flux in said first magnetic means and the emanation of flux from said first magnetic means through the outer ends thereof.

6. The separator assembly of claim 5 wherein each of said first magnetic means comprise an elongated member of high energy magnetic material.

7. The separator assembly of claim 5 wherein said first magnetic means comprise stacked members of ceramic magnetic material having a relatively high energy product with respect to said second magnetic means.

8. A magnetic separator comprising, in combinaton,
a first member,
a magnetic field generating assembly supported adjacent said first member,
means supporting said first member for movement in a given direction within the influence of the field generated by said magnetic field generating assembly,
said magnetic field generating assembly comprising,
   a plurality of relatively spaced magnetic field generating means each having an extension generally at an angle to said direction of movement of said first member and being magnetized in the direction of said extension to present a given magnetic polarity to said first member,
   and magnetic flux blocking means disposed operatively adjacent each of said field generating means and producing a magnetic field along the extension of said field generating means of a magnetic polarity which corresponds to the magnetic polarity presented by said field generating means to said first member to thereby block the leakage of flux along said extension and concentrate generated flux in said field generating means and the emanation of flux from said field generating means through the ends thereof presented to said first member,
      means engaged between and completing a closed magnetic path between adjacent ones of said field generating means.

9. The magnetic separator of claim 8 wherein said field generating means are relatively spaced in the direction of movement of said first member and adjacent field generating means present different magnetic polarities to said first member,
and wherein said magnetic flux blocking means are disposed between adjacent ones of said field generating means and are magnetized in the direction of movement of said first member to present opposite magnetic polarities at the opposite ends thereof.

10. A magnetic circuit comprising, in combination,
first and second field generating magnetic means of high energy product magnetic material each having a magnetic axis and an extension parallel to said magnetic axis,
means connected between and engaging said first and second field generating means at a point spaced axially from one of the axial ends thereof and providing a closed flux path between said first and second field generating means, said first and second field generating means arranged in relative spaced relation to provide areas of different magnetic polarity whereby leakage between said first and second field generating means and along said extensions thereof may occur,
and magnetic flux blocking means having a relatively high magnetic coerciveness with respect to said field generating means and a magnetic axis and disposed between said first and second field generating means with the magnetic axis thereof extending in the direction of a transversal to the magnetic axes of said first and second field generating means, said magnetic flux blocking means extending between said means connected between said first and second magnetic means and said one axial end of said first and second magnetic means and arranged to present to each of said first and second magnetic means a magnetic polarity corresponding to the magnetic polarity presented at said one axial end of said first and second magnetic means to thereby prevent said leakage along the extensions of said first and second magnetic means and concentrate generated flux in said first and second magnetic means and the emanation of flux from said axial ends.

11. In a magnetic circuit comprising,
first and second magnetic means having a high energy product and each having a magnetic axis and an extension parallel to said magnetic axis, said first and second magnetic means arranged in relative spaced relationship and magnetized to present alternate magnetic polarity at corresponding axial ends thereof but positioned so that leakage of magnetic flux can occur between said first and second magnetic means along the magnetic axis thereof,
means connecting said first and second magnetic means and completing a flux path therebetween,
and magnetic flux blocking means of relatively high coercive material with respect to said first and second magnetic means and disposed between said first and second magnetic means and having a magnetic axis extending in the direction of a transversal to the magnetic axes of said first and second magnetic means, said magnetic flux blocking means arranged relative to said first and second magnetic means to present a magnetic polarity along the magnetic axis of each of said first and second magnetic means which corresponds to the polarity presented at said axial ends of said first and second magnetic means to thereby prevent said flux leakage and concentrate generated flux in said first and second magnetic means and the emanation of flux from said first and second members through the ends thereof whereby a relatively high strength magnetic field is generated at said axial ends.

12. In a magnetic separator having a working member and means for generating a magnetic field at said working member, said magnetic field generating means comprising,
magnetic field generating means,
magnetic means engaging said field generating means in spaced relation from said working member to provide a flux path in the magnetic circuit of said field generating means,
said field generating means having plural poles extending toward said working member from the area of engagement with said magnetic means and terminating at said working member, said field generating means magnetized in the direction of said extension to present a magnetic polarity to and generate a magnetic field at said working member,
and magnetic flux blocking means of material having a relatively high coerciveness with respect to said field generating means and having an extension along said field generating means and magnetized to present a magnetic polarity to said field generating means corresponding to the polarity presented by each of the poles to said working member to block flux leakage and concentrate the emanation of generated flux from said field generating means at said working member thereby producing a relatively high strength magnetic field at said working member.

13. The separator of claim 12 wherein said field generating means is of material having a relatively high energy product.

14. A magnetic circuit comprising, in combination,
magnetic field generating means comprising plural polar extensions, at least one of which comprises material having a high energy product magnetic material and having a magnetic axis,
magnetic means engaging said one polar extension in spaced relation from one of the polar ends thereof,
magnetic flux blocking means having high magnetic coerciveness with respect to said one polar extension and an extension along the magnetic axis of said one polar extension between said polar end and said magnetic means, said blocking means magnetized to present a magnetic polarity to said one polar extension corresponding to the magnetic polarity presented at said polar end to concentrate generated flux in said field generating means and emanation of magnetic flux from said polar extensions to provide a relatively high strength magnetic field at said polar extensions, and the magnetic means providing a flux path between said polar extensions of said field generating means independent of said magnetic flux blocking means.

References Cited
UNITED STATES PATENTS

| | | | |
|---|---|---|---|
| 2,466,839 | 4/1949 | Caldwell | 210—222 |
| 2,596,554 | 5/1952 | Hoff | 209—219 |
| 2,695,709 | 11/1954 | Stearns et al. | 210—222 |
| 3,146,191 | 8/1964 | Greenwald | 209—223 |
| 3,168,464 | 2/1965 | Ferris et al. | 209—223 |
| 2,398,653 | 3/1946 | Linlor | 335—304 |
| 3,168,686 | 2/1965 | King et al. | 335—306 |

SAMIH N. ZAHARNA, *Primary Examiner.*

REUBEN FRIEDMAN, *Examiner.*

F. MEDLEY, *Assistant Examiner.*

UNITED STATES PATENT OFFICE
CERTIFICATE OF CORRECTION

Patent No. 3,365,599                          January 23, 1968

Donald E. Brzezinski et al.

It is certified that error appears in the above identified patent and that said Letters Patent are hereby corrected as shown below:

Column 7, line 64, for "into" read -- with --; line 70, for "high" read -- said --; column 8, line 33, strike out "of".

Signed and sealed this 24th day of June 1969.

(SEAL)
Attest:

Edward M. Fletcher, Jr.                      WILLIAM E. SCHUYLER, JR.
Attesting Officer                                    Commissioner of Patents

PO-1050
(5/69)

UNITED STATES PATENT OFFICE
CERTIFICATE OF CORRECTION

Patent No. 3,365,599        Dated January 23, 1968

Inventor(s) DONALD E. BRZEZINSKI and RAYMOND L. WATTS

It is certified that error appears in the above-identified patent and that said Letters Patent are hereby corrected as shown below:

Delete from lines 25-29, Column 5, the portion "which has a generally maximum energy product, energy product being the conventional manner of defining the ability to accommodate the flux concentration discussed above. Furthermore,"; and Insert the following at line 31, Column 5, after "and" and before "the":

--which has a generally maximum energy product, energy product being the conventional manner of defining the ability to accommodate the flux concentration discussed above. Furthermore,--.

Signed and sealed this 25th day of April 1972.

(SEAL)
Attest:

EDWARD M. FLETCHER, JR.        ROBERT GOTTSCHALK
Attesting Officer              Commissioner of Patents